J. C. HOLLINGS.
VEHICLE TIRE.
APPLICATION FILED MAY 8, 1912.

1,063,972.

Patented June 10, 1913.

Witnesses:
Carl L. Choate
Horace A. Crosman

Inventor:
John C. Hollings,
by Emery Booth Janney Varney
Attys.

UNITED STATES PATENT OFFICE.

JOHN C. HOLLINGS, OF BOSTON, MASSACHUSETTS, ASSIGNOR TO FLORA S. ALDEN, OF BOSTON, MASSACHUSETTS.

VEHICLE-TIRE.

1,063,972.

Specification of Letters Patent. Patented June 10, 1913.

Application filed May 8, 1912. Serial No. 695,873.

*To all whom it may concern:*

Be it known that I, JOHN C. HOLLINGS, a citizen of the United States, and a resident of Boston, county of Suffolk, State of Massachusetts, (whose post-office address is 99 Pinckney street, Boston, Mass.,) have invented an Improvement in Vehicle-Tires, of which the following description, in connection with the accompanying drawings, is a specification, like characters on the drawings representing like parts.

This invention relates to tires, being more particularly intended to provide an improved, relatively inexpensive, but durable, tire member which may be embodied in the form of a complete tire in itself or in the form of a protective outer shoe or as a lining or re-inforcement for an outer tire member, the latter of rubber or other material.

In carrying out my invention I employ a fabric composed of interwoven resilient filaments such, for example, as strands of steel wire, these being interwoven so as to produce a relatively resilient or yielding fabric. A tire member formed of such fabric is then compressed in a longitudinal direction so as to crowd together the wires or other filaments contracting the fabric lengthwise the tread of the tire, while expanding it laterally. In this condition the member is then applied to the wheel in such fashion as to be there maintained and held under compression, thereby producing from a light and resilient fabric a strong and firm tire, resembling very closely in its combined resiliency and firmness the qualities of an inflated pneumatic tire. The stiffness of the tire can be varied by varying the size and strength of the wires and the degree of compression applied to the fabric.

My invention will be best understood by reference to the following description when taken in connection with the accompanying illustration showing one specific form thereof, while its scope will be more particularly pointed out in the appended claims.

Figure 1:
Figure 2:
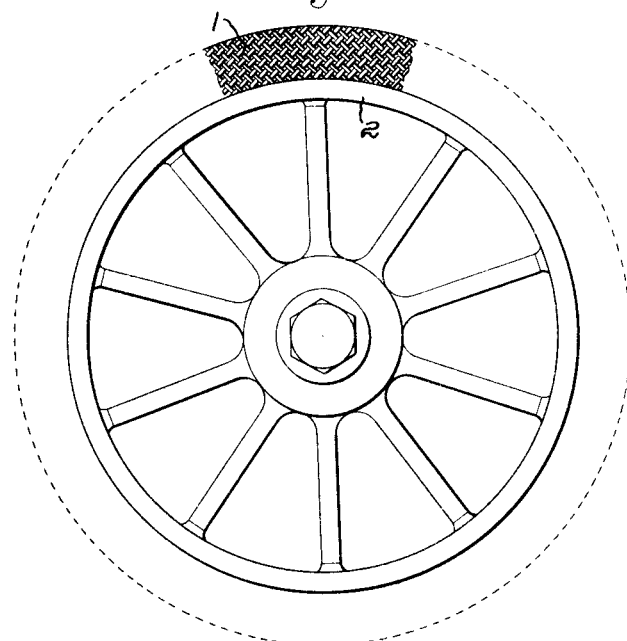
Figure 3:
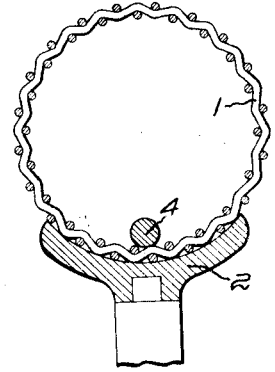
Figure 4:
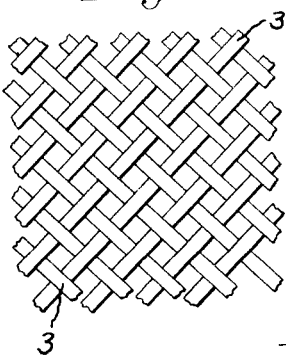
Figure 5:
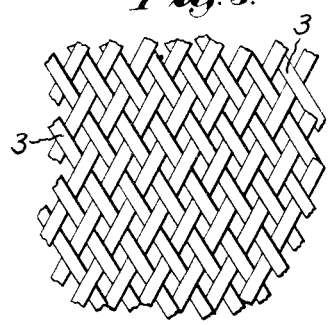
Figure 6:
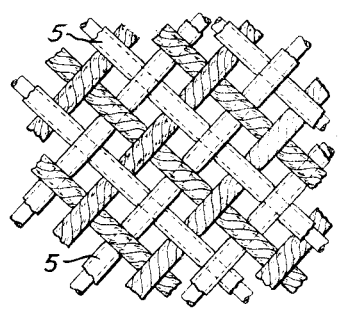
Figures 7, 8:
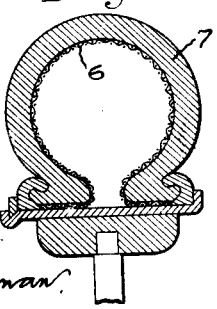
Figure 9:
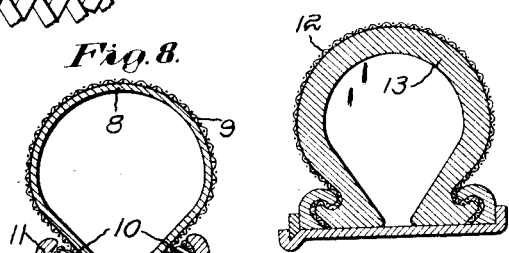

In the drawings: Figure 1 illustrates a section of a tire member before application to the vehicle wheel, embodying one form of the invention; Fig. 2 shows a vehicle wheel with the tire applied thereto; Fig. 3 is a section taken through the tire and the wheel rim; Fig. 4 is an enlarged detail showing the fabric before compression; Fig. 5 is a similar view showing the fabric after compression; Fig. 6 is a detail showing a fabric where the wires are covered or coated with another material; and Figs. 7, 8 and 9 show modified forms of the invention.

Referring to the drawings and first to the modification shown in Figs. 1 to 5, inclusive, the tire member 1 is composed of resilient filaments preferably steel wires, such as piano wires, these being interwoven to produce a tubular fabric member. This tubular member when applied to the vehicle wheel rim 2 is wrapped around the same and then compressed in a longitudinal direction so that the wires 3 are crowded toward or against one another, closing or partly closing the meshes so that they assume some such form as is shown in Fig. 5. This at the same time contracts the tubular member in a longitudinal direction, while expanding it transversely. The ends of the tubular member which is thus contracted and compressed about the tire rim are joined together in any suitable manner as by welding the same to form a closed annular tire member. The tire member with its interwoven wires thus placed under longitudinal compression is held in this state of condition upon the rim by any suitable means, such as the metallic retaining ring 4 which is passed through the tube and drawn tight about the rim, while its ends are welded together to securely hold the compressed tube in position. This may be assisted by other retaining means, the entire seat of the tube, if desired, being brazed to the rim 2. The longitudinal compression of the fabric tends to crowd the wires into a position more nearly transverse the tread of the tire to force each one of the interwoven wires into a position where it is more or less bowed outwardly relatively to the tread of the tire and where it tends to remain in that position under the compression strain and by reason of the crowding and support effected by the adjacent members of the fabric. This converts the fabric into a continuous resilient surface having a much higher degree of resiliency than the fabric in its original condition. By varying the compression the resiliency and stiffness of the tire can be varied and by increasing the size of the wires a tire may be produced capable of sustaining the heaviest loads.

In Fig. 6 I have illustrated a portion of a tire fabric similar to that disclosed in Figs.

1 to 5, inclusive, wherein the wire or other filaments are covered with a coating 5 of some other material, such as rubber, which, when the fabric is compressed as described, forms a substantial closure for the meshes between the wires and also provides a good frictional grip for the tire tread.

In Fig. 7 there is shown another modification wherein the woven wire fabric represented at 6 is applied to the inner surface of an ordinary rubber tire shoe 7, the latter being applied to the vehicle rim in usual or any suitable manner. The wire fabric member 6 is held in the shoe under longitudinal compression so as to crowd the wires together as in the form shown in Fig. 5, such member being held in position within the shoe by any suitable means. Preferably the fabric is placed under compression and in this condition is vulcanized to the inner surface of the shoe so that it is permanently retained in that condition and forms an integral part of the shoe and may be removed or replaced with the shoe at will. In this form the compressed fabric member affords the required resiliency customarily provided by the inner tube.

In the form shown in Fig. 8, the wire fabric member 9 is employed as the shoe itself to protect the inflated inner tube 8, the latter being of usual construction. In this form the wire fabric is held under compression in any suitable way. In the form illustrated large wires or rods 10 are employed, the fabric being originally woven with the wires looped about the rods 10 so that the fabric is permanently attached thereto. The fabric is then compressed as previously described upon the rods themselves and the latter being bent into hoop form, their ends are welded together and adjacent ends of the fabric member also united as by welding. This provides a wire fabric shoe with the fabric under longitudinal compression which can be slipped into position on the rim and clamped by means of the attached rods 10 and a clamp, or the rods may be welded in position on the rim. The resiliency and stiffness of the tire member 9 may be made sufficient to obviate the need of the inner shoe 8 and the latter, if desired, may be omitted, the wire fabric member, however, being attached as illustrated in Fig. 8, but serving the same function as the tire member 1 in Fig. 2.

Fig. 9 shows a construction similar to Fig. 7, the wire fabric member 12 being vulcanized while under compression upon the outer surface of the rubber shoe 13, thereby providing the required resiliency for the tire.

The invention may be embodied in various other forms and modifications, but the foregoing will be sufficient to illustrate the principles thereof, it being evident that the invention is not limited to the details or particular form disclosed but that extensive deviations may be made therefrom without departing from the essence of the invention.

Claims.

1. A vehicle tire having a shoe formed of an interwoven wire fabric member, the fabric of the shoe being held under longitudinal compression to abnormally contract the dimension of the fabric lengthwise the tread and expand it transversely the tread.

2. A vehicle tire having a fabric member composed of interwoven wire, the fabric being held under longitudinal compression to abnormally crowd the wires together.

3. A vehicle tire having a fabric member composed of interwoven resilient filaments and means for holding the fabric member on the rim of the vehicle wheel under longitudinal compression whereby the dimension of the fabric lengthwise the tread is contracted and its transverse dimension expanded.

4. A vehicle tire having a tire fabric member composed of loosely interwoven wire, the fabric being held under longitudinal compression to abnormally crowd the wires together.

In testimony whereof, I have signed my name to this specification, in the presence of two subscribing witnesses.

JOHN C. HOLLINGS.

Witnesses:
 E. EDNA SPRY,
 THOMAS B. BOOTH.